United States Patent Office 3,418,100
Patented Dec. 24, 1968

3,418,100
METHOD OF MANUFACTURING A PARTICULATE
AMMONIUM HUMATE FERTILIZER
Albert M. Cooley, 405 Cambridge St.,
Grand Forks, N. Dak. 58201
No Drawing. Filed Jan. 5, 1965, Ser. No. 423,578
8 Claims. (Cl. 71—24)

ABSTRACT OF THE DISCLOSURE

The relatively dry method of forming the fertilizer utilizing leonardite as a source of humates by pulverizing metal humate-containing leonardite ore and preferably enriching the pulverized leonardite ore with predetermined amounts of fertilizer compositions such as ammonium nitrate, muriate of potash, urea and the like, and then admixing the pulverized enriched ore with a phosphoric acid and wherein an excess of the acid necessary to bring about the conversion of the metal humates to humic acid is utilized but wherein the amount of acid utilized does not sufficiently wet the enriched ore sufficiently to cause it to become a slurry, whereby the maintaining of the acidified enriched ore in such a relatively dry state greatly simplifies the process whereby significant economies are realized by avoiding the necessity of having to mechanically separate or remove moisture from a slurry. The maintenance of a relatively dry state permits the simultaneous pelletizing of the moist acidified enriched ore whereby the exothermic nature of the ammoniation reaction to form ammonium humates by reaction of the humic acid with the ammonia effects sufficient drying of the pellets so formed whereby relatively little additional heat is required to dry the fertilizer pellets formed to an equilibrium state which for the product produced is approximately 16% moisture.

---

This invention relates generally to a method of producing a fertilizer and soil conditioner and more particularly the preparation of a pelletized fertilizer and soil conditioner from leonardite, which is a naturally oxidized lignitic material with a high percentage of metal humates and minor proportions of humic acid, which are essential for normal plant growth.

Leonardite in its natural state is composed of mainly insoluble calcium and iron and aluminum humates. The calcium content of leonardite is generally much higher than the iron content and accordingly treatment with materials which form insoluble calcium salts increase the solubility of the humate. Although leonardite is an abundant source of humic acid, its utilization for the production of fertilizer has been limited due to a lack of a simple, efficient means of rendering the humic acid soluble.

Previous attempts to render the humic acid content of leonardite available, as a plant nutrient, have involved the utilization of processes which were inefficient and generally unsatisfactory. Generally, attempts were made to render the leonardite colloidal by ammoniation, but over a period of time the ammonia was lost and the plant nutrients again became insoluble. Additionally, the processing of the leonardite generally involved numerous steps, one of which was the separation of the insoluble material by a filtration process which involved the addition of large amounts of water, i.e., establishment of a slurry, which thus necessitates the subsequent removal of relatively large volumes of water.

Accordingly, it is an object of this invention to provide a method of efficiently recovering humic acid from lignitic material.

Another object of this invention is to provide a fertilizer soil conditioner which comprises substantially all of the necessary plant nutrients in readily available form.

Still another object of this invention is to extract humic acid from lignitic materials and combine the humic acid with ammonia to form colloidal ammonium humates and add other plant nutrients to provide a controlled nitrogen release fertilizer and soil conditioner which includes substantially all of the common plant nutrients (NPK) for normal plant growth while improving the tilth of the soil.

In general, the present invention provides a simple, highly efficient process for the production of a free-flowing pelletized, controlled nitrogen release fertilizer in basically a single pelletizing operation without the necessity of utilizing any solvent extraction steps.

The processing of the leonardite in accordance with this invention involves the mechanical reduction of the leonardite by grinding. The pulverized leonardite is subsequently mixed with ammonium nitrate and muriate of potash or urea, for example, and introduced into a continuous rotary drum pelletizer. Phosphoric acid, such as orthophosphoric, polyphosphoric, or pyrophosphoric acid for example, is fed into the inlet of the drum pelletizer to form humic acid and anhydrous ammonia gas is fed into the discharge end of the drum pelletizer to maintain an ammonia atmosphere throughout the drum which combined with the humic acid to form colloidal ammonium humates.

The drying of the pellets to a desired moisture content is initiated by the exothermic reaction within the drum pelletizer, and the drying is completed by introducing the pellets into a rotary dryer and subjecting the damp pellets to a counterflow of heated air.

More specifically the leonardite in the "as mined" condition is pulverized in a grinding mill, with an associated classifier, to a fineness of about 6 to 7 mesh (U.S. Bureau of Standards) or about .125 inch. Even though the finished fertilizer pellets are preferably about .125 inch in size, it is not generally necessary to pulverize the leonardite any finer than about 6 to 7 mesh because of the earthy nature of the leonardite and its tendency to soften and disintegrate in the initial stage of the pelletizing process.

The leonardite, in addition to its metal humate and humic acid content, contains small amounts of colloidal clay and charcoal-like carbonaceous material which is relatively inert. These diluents generally comprise about 15% of the leonardite, although the percentage of diluent is highly variable and may be higher or lower than 15%. Their removal is generally not necessary in the practice of this invention.

The pulverized classified leonardite being delivered from the grinding mill is mixed with enriching fertilizer compositions such as ammonium nitrate, urea, and muriate of potash for example. Preferably, the pulverized, i.e., particulate, leonardite is fed onto a suitable inert conveyor belt to form a continuous ribbon of leonardite. Appropriate proportions of particulate ammonium nitrate and particulate muriate of potash are metered onto the pulverized leonardite on the belt, i.e., the particulate components do not flow off the belt as would a slurry. The mix is then fed to a rotating drum pelletizer, of conventional design, where it is treated by spraying, for example, with an excess of phosphoric acid and as noted hereinafter the acidified mixture is merely damp, i.e., still particulate. Sufficient phosphoric acid must be added to react completely with the calcium humate of the leonardite to free the humic acid for combination with the ammonia to form a stable soluble combination which is not lost under storage conditions but is available for plant use within the soil. The phosphoric acid replaces the metal ions of the humate to form humic acid which is then combined with ammonia to form colloidal ammonium humate.

Preferably the phosphoric acid is sprayed onto the leonardite ammonium nitrate-muriate of potash mixture as it enters the pelletizer drum. Although it is preferable to utilize a continuous process, as described, a batch process could be utilized. The intimately mixed, damp, acid, i.e., still particulate, treated mixture in the pelletizing drum is then subjected to an appropriate proportion of anhydrous ammonia gas which is introduced at the discharge end of the pelletizing drum and consequently forms an ammonia atmosphere throughout the drum, thus still maintaining the particulate nature of the ammoniated mixture. There is some generation of heat as the ammonia reacts with the humic acid in the pellets to form the ammonia salt. Accordingly, this exothermic reaction initiates the drying of the formed pellets as they discharge from the pelletizing drum into a drying drum. The conventional rotary pelletizing drum utilized in the practice of this invention was about eight feet long and about six feet in diameter. In a drum of this nature the approximate through time for the material undergoing pelletizing is about 12 minutes. Accordingly, it may be seen that the instant process is highly practical for large scale processing.

The amount of nitrogen which the finished product will absorb and retain is directly proportional to the excess phosphoric acid employed. As described, the final product will have a readily available quick or "booster" nitrogen content due to the ammonium nitrate added to the pulverized leonardite prior to pelletizing. If a slower release of the nitrogen is desired, urea may be added to the pulverized leonardite in place of the ammonium nitrate. The advantages of both may be had by adding them simultaneously prior to pelletizing, thereby yielding a controlled nitrogen release fertilizer.

As stated heretofore, the minimum amount of phosphoric acid necessary is that which will completely react with the iron and calcium of the leonardite, however there is no upper or lower limit for the other constituents except that as the ammonium nitrate, urea, muriate of potash, phosphoric acid and ammonia content is increased, the leonardite content decreases. This material is desired for its soil conditioning properties and its effects in regulating the release of nitrogen from the finished product.

The damp fertilizer pellets discharging from the rotary drum pelletizer are then introduced into a rotary drum drier where they are subjected to a counterflow of heated air to reduce their total moisture content to about 16%, which is approximately the equilibrium moisture content of the leonardite. The conventional continuous drum dryer utilized was about thirty feet long by about 5 feet in diameter. The pellets were dried to the desired moisture content by direct contact with the combustion gases from an oil burner unit. The temperature of the drying gases is regulated so that the pellets do not exceed about 180° F.

EXAMPLE

A specific example of a fertilizer-soil conditioner produced in accordance with this invention comprises:

| Approx., Percent | Pounds | |
|---|---|---|
| 59.6 | 1,453 | Leonardite (about 6 to 7 mesh U.S. Bureau of Standards). |
| 18.5 | 450 | 75% orthophosphoric acid. |
| 12.3 | 300 | Ammonium nitrate. |
| 6.2 | 150 | Potassium chloride (muriate of potash). |
| 3.4 | 84 | Anhydrous ammonia. |
| 100.0 | 2,437 | Total fertilizer (16% moisture) pellets of about 6 to 7 mesh. |

The lower limit of phosphoric acid is approximately 31.5 pounds or 1.2% of 75% orthophosphoric acid for the amount of leonardite shown. This, of course, may be expected to vary slightly depending upon the iron-calcium humate assay of the leonardite.

The above materials were processed as described heretofore in a rotary drum pelletizer and rotary drum dryer. The pellets formed by this process are free-flowing and soluble, becoming colloidal in water solution. When applied as a fertilizer-soil conditioner they exhibit a controlled fertilizer release. The colloidal characteristic also increases the moisture holding capacity of the soil. The soil agglomerating characteristic of the humic acid and ammonium humate improves the tilth of the soil and facilitates both air and water passage therefore improving the availability of nutrients to the plants.

The example given is a common one for garden and lawn fertilizers from the standpoint of nitrogen, phosphorus, and potash content.

It may therefore be seen that the instant invention has provided a fertilizer produced from leonardite by a process which is simple, efficient and economical and therefore readily adaptable to the production of fertilizer on a commercial scale.

While a specific example of a fertilizer composition produced in accordance with the instant process has been described, it will be understood that it is not to be limited to all of the details shown, but is capable of modification and variations within the spirit of the invention and within the scope of the claims.

What is claimed as new is as follows:

1. The method of forming a fertilizer which comprises the steps of: pulverizing an ore containing metal humates; enriching the pulverized ore with particulate fertilizer compounds selected from the group consisting of ammonium nitrate, muriate of potash and urea; admixing the pulverized enriched ore with an acid selected from the group consisting of orthophosphoric acid, polyphosphoric acid and pyrophosphoric acid whereby said acid substantially replaces metal ions of said metal humates to form humic acid while maintaining said acidified mixture in a particulate state; reacting said humic acid with anhydrous ammonia to effect reaction of humic acid with said ammonia to form colloidally dispersed ammonium humate, still maintaining the ammoniated fertilizer in a particulate state, while pelletizing said fertilizer compound enriched ammonium humate; and drying said pellets to obtain a free-flowing pelletized fertilizer.

2. The method of forming a fertilizer which comprises the steps of: pulverizing leonardite ore containing metal humates to a fineness of about 6 mesh U.S. Bureau of Standards; enriching the pulverized leonardite ore with predetermined amounts of particulate fertilizer compounds selected from the group consisting of ammonium nitrate, muriate of potash and urea; admixing the pulverized enriched ore with an excess of an acid selected from the group consisting of orthophosphoric acid, polyphosphoric acid and pyrophosphoric acid whereby said acid substantially replaces metal ions of said metal humates with hydrogen ions to form humic acid while maintaining said acidified mixture in a particulate state; reacting said humic acid with anhydrous ammonia to effect reaction of humic acid with said ammonia to form colloidally dispersed ammonium humate, still maintaining the ammoniated fertilizer in a particulate state, while pelletizing said fertilizer compound enriched ammonium humate; and drying said pellets to obtain a free flowing fertilizer.

3. The method according to claim 2 wherein said enriching fertilizer compounds are ammonium nitrate and muriate of potash.

4. The method according to claim 2 wherein said enriching fertilizer compounds are urea and muriate of potash.

5. The method according to claim 2 wherein the enriching fertilizer compounds are ammonium nitrate and urea.

6. The method of forming a fertilizer which comprises the steps of: pulverizing leonardite ore containing metal humate to a fineness of about 6 mesh U.S. Bureau of Standards; enriching the pulverized leonardite ore with predetermined amounts of particulate fertilizer compounds selected from the group consisting of ammonium nitrate, muriate of potash and urea; admixing the pulverized enriched ore with an excess of an acid which is capable of contributing hydrogen ions whereby said acid substantially replaces metal ions of said humate with hydrogen ions to form humic acid while maintaining said acidified mixture in a particulate state; reacting said humic acid with anhydrous ammonia to effect reaction of humic acid with said ammonia to form colloidally dispersed ammonium humate, still maintaining the ammoniated fertilizer in a particulate state, while pelletizing said enriched ammonium humate; and drying said pellets to obtain a free flowing fertilizer.

7. The fertilizer product produced by the method of claim 1.

8. The method of forming a fertilizer from leonardite ore which comprises the steps of: pulverizing the metal humate-containing leonardite ore; enriching the pulverized leonardite with at least one particulate fertilizer compound selected from the group consisting of ammonium nitrate, muriate of potash and urea; admixing the pulverized fertilizer compound enriched ore with an acid selected from the group consisting of orthophosphoric acid, polyphosphoric acid and pyrophosphoric acid substantially replaces the metal ions of said metal humates to form humic acid while maintaining said acidified mixture in a particulate state; reacting said humic acid with anhydrous ammonia to effect reaction of said humic acid with said ammonia to form colloidally dispersed ammonium humate, still maintaining the ammoniated fertilizer in a particulate state, while generally simultaneously effecting the pelletizing of said fertilizer compound enriched ammonium humate whereby the heat of reaction significantly dries the pellets formed.

References Cited
UNITED STATES PATENTS

| | | | |
|---|---|---|---|
| 3,111,404 | 11/1963 | Karcher et al. | 71—41 X |
| 3,264,084 | 8/1966 | Karcher | 71—24 |

DONALL H. SYLVESTER, *Primary Examiner.*

R. D. BAJEFSKY, *Assistant Examiner.*

U.S. Cl. X.R.

71—27, 54, 61